United States Patent
Adolf et al.

(10) Patent No.: US 9,961,333 B1
(45) Date of Patent: May 1, 2018

(54) SYSTEM AND METHOD FOR LIGHT FIELD PROJECTION

(71) Applicant: X Development LLC, Mountain View, CA (US)

(72) Inventors: Brian Adolf, San Mateo, CA (US); Richard DeVaul, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 0 days. days.

(21) Appl. No.: 15/178,685

(22) Filed: Jun. 10, 2016

(51) Int. Cl.
| | |
|---|---|
| *G03B 21/602* | (2014.01) |
| *H04N 9/31* | (2006.01) |
| *H04N 13/04* | (2006.01) |
| *G03B 21/606* | (2014.01) |
| *G02B 26/12* | (2006.01) |
| *G02B 26/10* | (2006.01) |

(52) U.S. Cl.
CPC ....... *H04N 13/0459* (2013.01); *G02B 26/101* (2013.01); *G02B 26/123* (2013.01); *G03B 21/602* (2013.01); *G03B 21/606* (2013.01); *H04N 9/3135* (2013.01); *H04N 9/3161* (2013.01); *H04N 9/3164* (2013.01); *H04N 13/0404* (2013.01); *H04N 13/0447* (2013.01); *H04N 13/0468* (2013.01); *H04N 13/0497* (2013.01); *H04N 9/3129* (2013.01)

(58) Field of Classification Search
CPC .... G03B 21/602; G03B 21/60; H04N 9/3129; H04N 9/3132; H04N 13/0404; H04N 13/0406; H04N 13/0459; H04N 13/0429; H04N 13/0434; G02B 27/225; G02B 27/2214

USPC .......................................................... 353/7, 8
See application file for complete search history.

(56) References Cited

U.S. PATENT DOCUMENTS

| | | | | |
|---|---|---|---|---|
| 4,978,202 A | * | 12/1990 | Yang .................... | G02B 26/101 345/419 |
| 5,483,254 A | * | 1/1996 | Powell ............... | G02B 27/2214 345/87 |
| 6,600,600 B2 | | 7/2003 | Chen | |

(Continued)

OTHER PUBLICATIONS

U.S. Appl. No. 15/361,641, filed Nov. 28, 2016; inventors: Richard DeVaul, Brian Adolf.

(Continued)

*Primary Examiner* — Ryan Howard
(74) *Attorney, Agent, or Firm* — Fish & Richardson P.C.

(57) ABSTRACT

The present disclosure relates to systems and methods for projecting a light field. One light field projection system includes a screen and a projection unit. On the screen, there is a plurality of convex reflective elements arranged in a two-dimensional array. The projection unit has a light source. The projection unit also has a modulator to modulate light from the light source. The projection unit further has one or more movable mirrored elements to reflect light from the light source toward the screen to sequentially scan the plurality of convex reflective elements. The projection unit also has a control system that determines a light modulation scheme used by the modulator. The light modulation scheme provides that the light reflected from the light source toward the screen to sequentially scan the plurality of convex reflective elements forms a light field that is concurrently viewable from a plurality of perspectives.

17 Claims, 13 Drawing Sheets

(56) References Cited

U.S. PATENT DOCUMENTS

| | | |
|---|---|---|
| 7,283,308 B2 | 10/2007 | Cossairt et al. |
| 7,746,559 B2 | 6/2010 | Sharon et al. |
| 7,929,207 B2 | 4/2011 | Yonekubo et al. |
| 8,497,934 B2 | 7/2013 | Milnes et al. |
| 2002/0006213 A1* | 1/2002 | Doudnikov ........ H04N 13/0404 382/103 |
| 2009/0273662 A1 | 11/2009 | Lucente |
| 2012/0127320 A1 | 5/2012 | Balogh |
| 2012/0262544 A1* | 10/2012 | Damera-Venkata H04N 13/0425 348/43 |
| 2012/0287502 A1* | 11/2012 | Hajjar .................... G03B 21/58 359/455 |
| 2013/0120714 A1* | 5/2013 | Nishioka ................ G02B 27/48 353/20 |
| 2014/0300869 A1 | 10/2014 | Hirsch et al. |
| 2016/0006914 A1 | 1/2016 | Neumann |
| 2016/0037146 A1 | 2/2016 | McGrew |
| 2016/0085084 A1 | 3/2016 | Masson |
| 2016/0116647 A1* | 4/2016 | Masson ................ G02B 5/3058 359/207.9 |
| 2016/0246165 A1 | 8/2016 | Wang |
| 2016/0291545 A1 | 10/2016 | Fan |

OTHER PUBLICATIONS

U.S. Appl. No. 15/297,579, filed Oct. 19, 2016; inventors: Richard DeVaul, Brian Adolf.

* cited by examiner

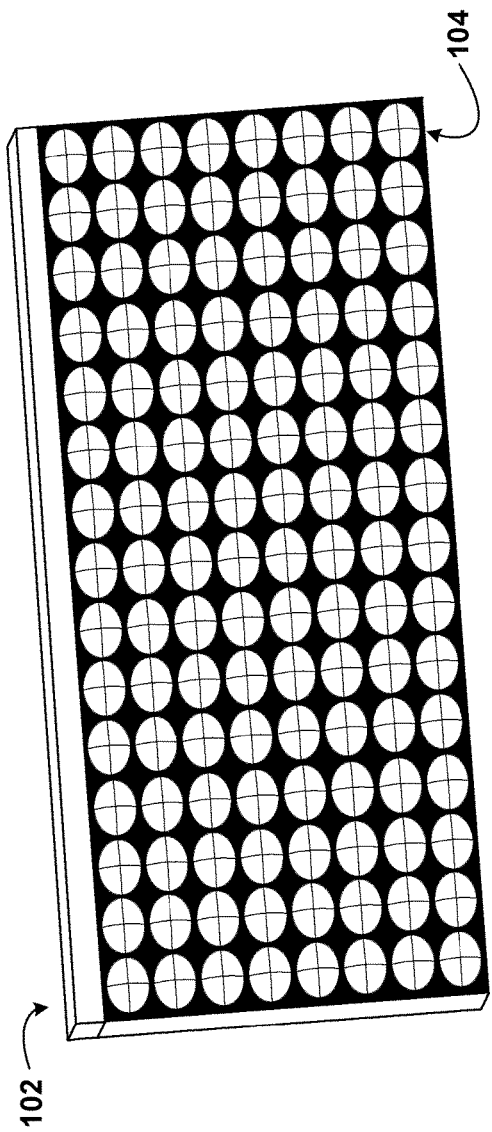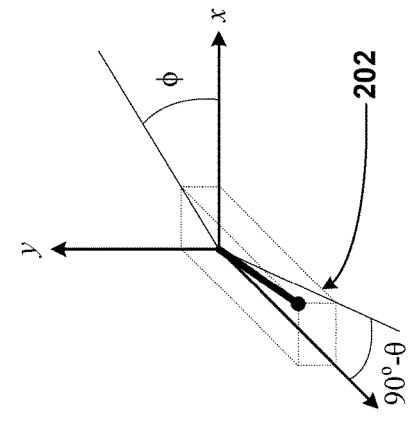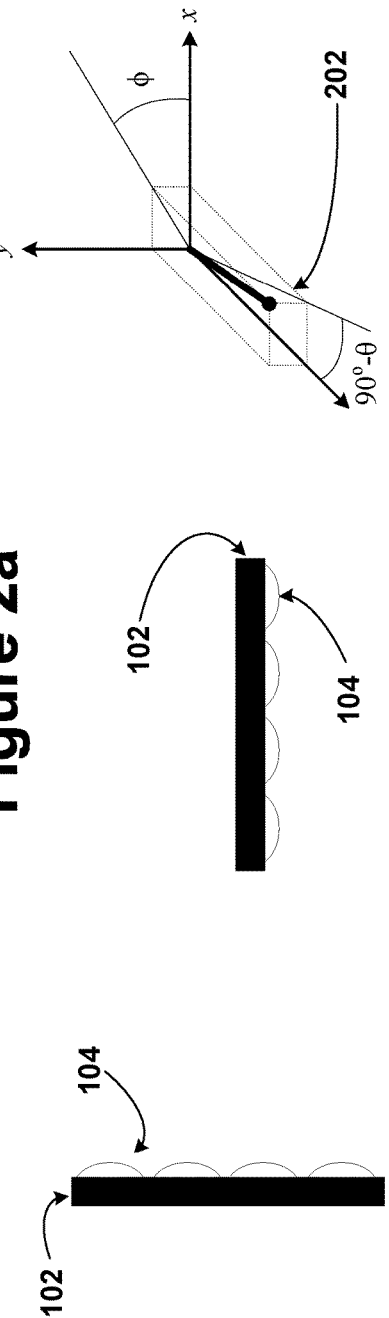
Figure 2a
Figure 2c
Figure 2b
Figure 2d

SYSTEM AND METHOD FOR LIGHT FIELD PROJECTION

BACKGROUND

Unless otherwise indicated herein, the materials described in this section are not prior art to the claims in this application and are not admitted to be prior art by inclusion in this section.

Three-dimensional (3D) displays/projections have become a topic of much interest in recent years. Many 3D displays require the cumbersome use of a headset (e.g., active or passive 3D glasses) by the viewer. Further, while glasses-less 3D display systems do exist, such systems may not allow for multiple viewers at different azimuthal viewing angles, elevations, and distances from the display.

A light field is a function (sometimes referred to as the "5D plenoptic function") that describes the composite of the amount of light flowing in a given direction at a given location for every location in space. If all the light that comprises a light field is emanating from one plane, for example, the function can be reduced to four dimensions. An example basis set of those four dimensions may be an x-location on the plane, a y-location on the plane, an azimuthal angle (from 0°-360°) in the plane (sometimes called $\varphi$), and an elevation angle (from 0°-90°, 0° being in the plane, 90° being exactly normal to the plane) out of the plane (sometimes called $\theta$). If an intensity, in Watts for example, is specified for each possible quadruple (x, y, $\varphi$, and $\theta$) at the plane (assuming the plane to be infinite in x and y directions), then a light field can be defined for every point in 3D space (barring interference with objects outside of the plane).

A light field display can generate such a light field, subject to practical limitations (e.g., the display plane is not infinite in x and y directions). The more granular the selection of values for each of the four dimensions, the higher the resolution of the viewable light field that is displayed. Additionally, the intensity of the light field displayed may only be defined for a single wavelength. Therefore, a number of light fields may be separately displayed at different wavelengths. In the visible spectrum, each wavelength represents the color of the respective light field, thereby enabling color light field displays.

A viewer may view the light field generated by a light field display from various locations in space and from various azimuthal and elevation angles. Given that a viewer has two eyes (and therefore two perspectives) from which to observe the light field, a viewer can spectroscopically observe the scene coming from the light field display in 3D.

SUMMARY

The specification and drawings disclose embodiments that relate to systems and methods for projecting light fields.

In one aspect the disclosure describes a light field projection system. The light field projection system includes a screen. The screen comprises a plurality of convex reflective elements arranged in a two-dimensional array. The light field projection system also includes a projection unit. The projection unit includes a light source. The projection unit further includes a modulator configured to modulate light from the light source. The projection unit additionally includes one or more movable mirrored elements. Each of the one or more movable mirrored elements is configured to reflect light from the light source toward the screen in such a manner as to sequentially scan the plurality of convex reflective elements. The projection unit also includes a control system. The control system is operable to determine a light modulation scheme for the modulator such that the light from the light source that is reflected by the one or more movable mirrored elements toward the screen to scan the plurality of convex reflective elements forms the light field that is concurrently viewable from a plurality of perspectives.

In another aspect the disclosure describes a method of generating a light field. The method includes emitting light from a light source. The method also includes reflecting, from one or more movable mirrored elements, the light emitted from the light source toward a screen, the screen including a plurality of convex reflective elements arranged in a two-dimensional array, in such a manner as to sequentially scan the plurality of convex reflective elements. The method further includes modulating the light emitted from the light source using a modulator according to a light modulation scheme. The light modulation scheme is determined by a control system such that the light from the light source that is reflected by the one or more movable mirrored elements toward the screen to sequentially scan the plurality of convex reflective elements forms the light field that is concurrently viewable from a plurality of perspectives.

In a third aspect the disclosure describes a light field projection system. The light field projection system includes a screen. The screen includes a plurality of concave refractive elements arranged in a two-dimensional array. The light field projection system also includes a projection unit. The projection unit includes a light source. The projection unit further includes a modulator configured to modulate light from the light source. The projection unit additionally includes one or more movable mirrored elements. The one or more movable mirrored elements are configured to reflect light from the light source toward the screen in such a manner as to sequentially scan the plurality of concave refractive elements. The projection unit also a control system. The control system is operable to determine a light modulation scheme for the modulator such that the light from the light source that is reflected by the one or more movable mirrored elements toward the screen to scan the plurality of concave refractive elements forms the light field that is concurrently viewable from a plurality of perspectives.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 2a-2d are illustrations of a screen (angled view, side view, top view, and a coordinate system, respectively), according to example embodiments.

DETAILED DESCRIPTION

Figure 1:
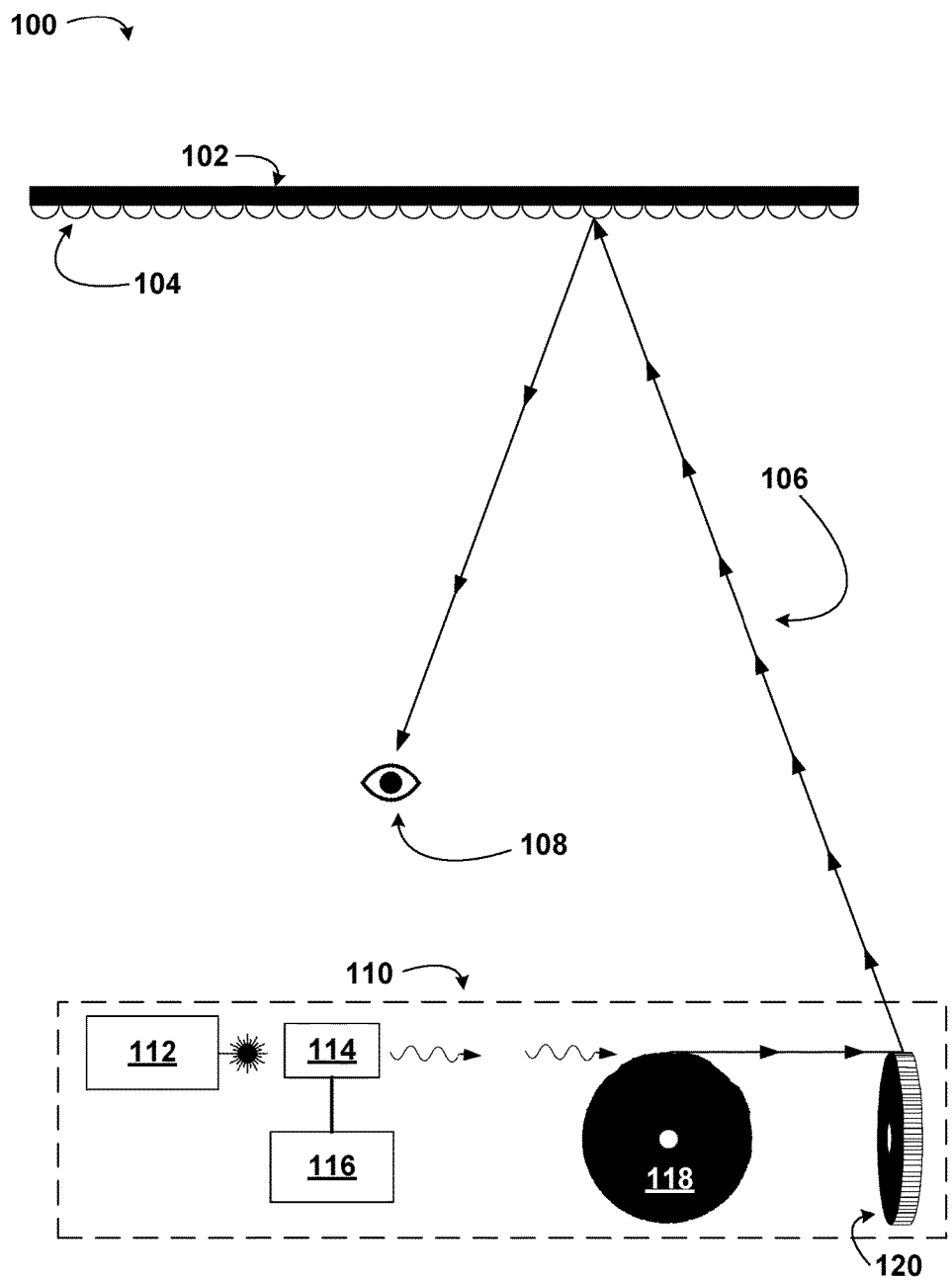
FIG. 1 is an illustration of a light field projection system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

An example embodiment includes a system that projects light fields. The system may display a light field to one or more observers. The light field may create scenes that are viewable by one or more observers at different locations without the need for special glasses/equipment. In addition, the perspective of the scene may be different depending on the location of the observer. Further, the light field may be viewed stereoscopically by both eyes of an observer. This may create a 3D scene for the observer. Still further, the system may sequentially project a series of light fields in quick succession to create a 3D movie viewable by the one or more observers. The light field projection system can be highly scalable.

Example embodiments include a light field projection system. The light field projection system includes a screen and a projection unit. The screen comprises a plurality of convex reflective elements arranged in a two-dimensional array. The projection unit comprises a light source, a modulator, one or more movable mirrored elements, and a control system.

The light source emits light that is sent to the modulator. The light source may be a laser, in some embodiments. The light emitted from the light source is then modulated by the modulator. The modulator may be an electro-optic modulator, for example. The light is modulated according to a modulation scheme determined by the control system. The control system may be a graphics processing unit (GPU) within a computing device, in some embodiments. After the light from the light source is modulated, it is then reflected from the one or more movable mirrored elements.

The movable mirrored elements aim the light toward various locations on the plurality of convex reflective elements. The movable mirrored elements do so in such a way as to sequentially scan the plurality of convex reflective elements. For instance, each of the convex reflective elements in the first row may be scanned at 10 different latitudinal locations, each with 10 different corresponding reflection points. Subsequent to this, the next row of convex reflective elements may be scanned at 10 different latitudinal locations, each with 10 different corresponding reflection points, and so on, until all the rows of convex reflective elements have been scanned. During each latitudinal scan across a single convex reflective element, the modulation rate may create, for example, 10 different intensities. If the convex reflective elements are hemispherical mirrors, this would provide 100 different, unique combinations of azimuthal and elevation angles for each convex reflective element. The light may then reflect off of these locations on the convex reflective elements back toward the projection unit. This method, therefore, provides a discrete light field originating from the plane of the screen comprising the convex reflective elements.

The reflected light may next be observed by an observer. The observer may observe those light rays with the proper quadruples (x, y, φ, and θ) reflected from the screen that correspond to their eye, for example. The intensities of the light rays at the given quadruples (i.e., the values of the "plenoptic" function) at which the observer is located may have been previously encoded by the modulator using the modulation scheme that was determined by the control system.

The modulation scheme may define the intensity of the light leaving the modulator at specific points in time corresponding to the points on the screen at which the light is being aimed by the one or more movable mirrored elements. The number of discrete azimuthal and elevation angles for each convex reflective element may be defined by the temporal resolution of the modulation scheme in conjunction with the spatial/angular resolution of the movable mirrored elements.

The modulation scheme encodes the light leaving the modulator such that the corresponding light field produced recreates one or more scenes at one or more locations that are concurrently viewable by one or more observers at a plurality of perspectives. If an observer has two viewing perspectives, like two eyes in the case of a human observer, the light field may be concurrently viewable from both of those perspectives simultaneously, thereby producing a stereoscopic 3D image viewable by the observer.

II. Example Systems

FIG. 1 is an illustration of a light field projection system 100, according to example embodiments. The light field projection system 100 includes a screen 102 and a projection unit 110. The screen has a plurality of convex reflective elements 104 arranged in a two-dimensional array thereon. The projection unit 110 projects a plurality of light rays 106 toward the screen 102. The light rays 106 may be reflected off the screen toward an observer 108 In addition, the projection unit 110 comprises a light source 112, a modulator 114, a control system 116, a horizontally rotating movable mirrored element 118, and a vertical rotating movable mirrored element 120.

The screen 102 has a surface on which the convex reflective elements 104 are disposed. In some embodiments, the convex reflective elements 104 will be molded into the screen 102 or stamped into the screen 102 by a machining process. Alternatively, the convex reflective elements 104 may be independently fabricated and adhered to the surface of the screen 102. The screen 102 may loosely resemble rigid bubble-wrap.

The screen 102 may be made of a non-rigid material, such as a polymer or a plastic. This may allow the screen 102 to be rolled or folded when not in use, for example. In other embodiments, the screen 102 may be made of a substantially rigid material, such as glass. The screen 102 is further illustrated in FIGS. 2a-2c and further described in the accompanying description.

The convex reflective elements 104 are disposed on or embedded in the surface of the screen 102. The convex reflective elements 104 serve to reflect light rays projected toward the screen 102 by the projection unit 110. The plurality of convex reflective elements 104 may have mirrored surfaces. For example, each convex reflective element 104 may be a glass substrate coated with silver or aluminum. In addition, the plurality of convex reflective elements 104 may be substantially hemispherical, having a diameter greater than the width of the light rays projected by the projection unit 110 (e.g., greater than the beam waist of the respective laser if the light source 112 is a laser).

In alternate embodiments, the convex reflective elements 104 may resemble squashed hemispheres. Because it is unnecessary for the convex reflective elements 104 to reflect light horizontally toward other convex reflective elements 104, it is unnecessary to have the regions of the convex reflective elements closest to the surface of the screen 102 (i.e., the "edges" of the convex reflective elements 104) be perfectly vertical.

In some embodiments, the plurality of convex reflective elements 104 may be more or less identical in shape regardless of their position in the two-dimensional array. Alternatively, the shape of each of the plurality of convex reflective elements 104 may depend on its location within the two-dimensional array. For example, the convex reflective elements 104 that are located nearer to the edges of the array may be more peaked, allowing for the reflection angle to be greater over a wider facial area of the convex reflective elements 104, thereby having the ability to reflect light toward the center of a viewing region in front of the screen 102 from a larger range of locations on its face. Likewise, the vertical dimension and the horizontal dimension of the plurality of convex reflective elements 104 may not be equal for an individual convex reflective element 104. Furthermore, the vertical and/or the horizontal dimensions may vary for different convex reflective elements 104 at different locations within the two-dimensional array.

The plurality of convex reflective elements 104 may additionally be faceted, rather than have a uniformly smooth surface. Potential designs and shapes of the convex reflective elements 104 are illustrated and discussed further with regard to FIGS. 3a-3d.

The observer 108/the light path 106 are illustrated in FIG. 1 to show one potential location relative to the light field projection system 100 in which they may reside. The projection unit 110 projects light toward the screen 102 to sequentially scan the two-dimensional array of convex reflective elements 104. The light projected toward the screen is then reflected by the plurality of convex reflective elements 104 to generate a light field viewable at a plurality of perspectives. The observer 108 may be located at one of the perspective locations. Thus, the observer 108 is able to observe the light field generated by the light field projection system 100 at the observer's respective quadruple within the light field (i.e., at a given x-location, y-location, φ-angle, and θ-angle relative to the screen 102).

The projection unit 110 comprises sub-units that project light toward the screen 102. In some embodiments, the projection unit 110 may be packaged within a singular housing. Alternatively, the projection unit 110 may utilize free space optics to link the various components comprising the projection unit 110. For example, the light source 112 may output light that is reflected by a mirror or focused by a lens prior to entering the modulator 114. Additionally, multiple components of the projection unit 110 could be located inside or behind the screen 102 with respect to the observer, in various embodiments.

The light source 112 may include a white light source, for example. The light source 112 may also include a lens for focusing the light generated by the light source 112 prior to the light being transmitted to the modulator 114. Furthermore, the light source 112 may include an optical filter to select specific wavelengths of light from the original source. For example, if the light source 112 includes a white light source, there may be an optical filter that only passes light in the range of red wavelengths in the optical spectrum so the light source 112 performs as a red light source.

In other embodiments, the light source 112 may be a laser, such as a fiber laser or a diode laser. This may permit specific colors to be projected by the projection unit 110 without a need for additional optics. Also, in embodiments where the light source 112 is a laser, the light could be tightly spatially focused before leaving the projection system 110, allowing for high resolution light fields reflected from the screen 102.

The modulator 114 alters the light generated by the light source 112. In some embodiments, the modulator 114 may alter the intensity of the light generated by the light source 112. The modulator 114 may do so, for example, according to a modulation scheme determined by the control system 116. The modulator 114 may be an electro-optic modulator in various embodiments (e.g., a Kerr cell, a Pockels cell, or a Mach-Zehnder interferometer). The modulator 114 may, in alternate embodiments, utilize multiple modulation schemes that are multiplexed with one another in time or combined in amplitude to allow for a greater variation in the intensity of the light output by the modulator 114 or to permit a greater dynamic range in that light. Alternatively or additionally, the light source 112 may modulate the light output by the light source 112.

The control system 116 determines the modulation scheme for use by the modulator 114. The control system 116 may determine the modulation scheme in order to produce a light field viewable at the perspective of the observer 108, for example. The control system 116 may be integrated into the projection unit 110, as illustrated in FIG. 1. Alternatively, the control system 116 may be integrated into the screen 102 or a separate device that is communicatively coupled to the projection unit 110. In some embodiments, the control system 116 may include one or more processing units, such as one or more central processing units (CPUs). Additionally or alternatively, the control system 116 may include one or more special purpose processing units, such as application specific integrated circuits (ASICs) or GPUs. The control system 116 may also include a non-volatile memory that stores instructions executable by one or more processing units and/or a volatile memory (e.g., random access memory—RAM) that aids one or more processing units in determining the modulation scheme.

In some embodiments, the control system 116, itself, may modulate the modulator 114 using the modulation scheme. In alternate embodiments, the modulation scheme determined by the control system 116 may be transmitted to the modulator 114 and carried out by the modulator 114. The modulation scheme may be rendered by the control system 116 based on an input scene. Furthermore, the modulation scheme may include renderings of different perspectives of the light field from different processing units. The separate rendered perspectives may then be multiplexed or superimposed by the control system 116 to form the modulation scheme that ultimately drives the modulator 114.

The horizontally rotating movable mirrored element 118 may define the horizontal location on the screen 102 at which the light from the light source 112 is aimed. In some embodiments, the horizontally rotating movable mirrored element 118 may be a thin cylinder with facets around the circumference (e.g., one facet for each horizontal location along the screen 102 to which the light will be directed). Each facet may have a planar mirror mounted on its exterior to reflect the light leaving the modulator 114. Furthermore, each facet may be oriented at a slightly different angle with respect to the horizontal axis of the screen 102 so as to reflect the light toward a slightly different horizontal location. In some embodiments, the horizontally rotating movable mirrored element 118 may rotate about magnetic bearings, which enable a high rotational velocity with low friction, and thus without the concern of heat generation and/or mechanical wear to the horizontally rotating movable mirrored element 118.

In some embodiments, the horizontally rotating movable mirrored element 118 may be driven by the control system 116. Alternatively, the horizontally rotating movable mirrored element 118 may independently rotate and a modulation scheme determined by the control system 116 and utilized by the modulator 114 may be synchronized to the rotation of the horizontally rotating movable mirrored element 118. Further, in alternate embodiments, the horizontally rotating movable mirrored element 118 may be replaced by a horizontally vibrating movable mirrored element.

The vertically rotating movable mirrored element 120 may define the vertical location on the screen 102 at which the light from the light source 112 is aimed. In some embodiments, the vertically rotating movable mirrored element 120 may be a thin cylinder with facets around the circumference (e.g., one facet for each vertical location along the screen 102 to which the light will be directed). Each facet may have a planar mirror mounted on its exterior to reflect the light leaving the modulator 114. Furthermore, each facet may be oriented at a slightly different angle with respect to the vertical axis of the screen 102 so as to reflect the light toward a slightly different vertical location. In some embodiments, the vertically rotating movable mirrored element 120 may rotate about magnetic bearings, which enable a high rotational velocity with low friction, and thus without the concern of heat generation and/or mechanical wear to the vertically rotating movable mirrored element 120.

In some embodiments, the vertically rotating movable mirrored element 120 may be driven by the control system 116. Alternatively, the vertically rotating movable mirrored element 120 may independently rotate and a modulation scheme determined by the control system 116 and utilized by the modulator 114 may be synchronized to the rotation of the vertically rotating movable mirrored element 120. Further, in alternate embodiments, the vertically rotating movable mirrored element 120 may be replaced by a vertically vibrating movable mirrored element.

As illustrated in FIG. 1, the superposition of a first respective facet on the horizontally rotating movable mirrored element 118 and a second respective facet on the vertically rotating movable mirrored element 120 off of which a light ray is reflected may determine a specific location on the screen 102 toward which the light ray is reflected. Such a light ray may contribute to generating a portion of a light field, for example.

The horizontally rotating movable mirrored element 118 and the vertically rotating movable mirrored element 120 may rotate about axes that are perpendicular to one another (as shown in FIG. 1). Alternatively, the horizontally rotating movable mirrored element 118 and the vertically rotating movable mirrored element 120 may rotate about parallel axes and have facets angled in such a way as to account for the parallel axially rotation (e.g., the facets on the horizontally rotating movable mirrored element 118 are angled in a planar fashion from left to right and the facets on the vertically rotating movable mirrored element 120 are angled in a planar fashion from top to bottom).

In some embodiments, a single movable mirrored element may be used rather than a composition of a horizontally rotating movable mirrored element 118 and a vertically rotating movable mirrored element 120. For example, a cylinder with facets around the circumference may be used, each facet having a planar mirror that has a slightly different angle with respect to the horizontal axis of the screen 104 and a slightly different angle with respect to the vertical axis of the screen 102. In this way, an array of locations on the screen 102 may have light reflected toward them from the projection unit 110 using a single movable mirrored element. In alternate embodiments, alternate means of sequentially scanning the convex reflective elements 104 by reflection of light from the light source 112 may be used in place of the movable mirrored elements 118/120.

The components of the light field projection system 100 are configured to produce a light field viewable from one or more perspectives of the observer 108. The light field, if viewed stereoscopically from two perspectives of the observer 108, may create a 3D view of a scene. Further, the light field projection system 100 may produce a light field viewable from perspectives of additional observers. Additionally, the light field produced by the light field projection system 100 may allow the observer 108 to move to various locations to view the scene recreated by the light field from various perspectives.

FIG. 2a is an angled view of the screen 102 and the plurality of convex reflective elements 104 thereon. The dotted lines on the plurality of convex reflective elements 104 serve to depict the three-dimensionality of the convex reflective elements 104 (i.e., the convex reflective elements 104 may have a substantially hemispherical shape, and therefore have a depth). The screen 102 may have many more rows and/or columns than depicted in FIG. 2a. FIG. 2a is provided as an example. Furthermore, adjacent rows of convex reflective elements may be off-set from one another, and similarly for adjacent columns. There may additionally be black/dark space (i.e., portions of the screen 102 that do not reflect light) between adjacent convex reflective elements. Such black/dark space may ensure that, if the screen is sequentially scanned by a projection unit 110 (as illustrated in FIG. 1), any extraneous light rays that do not contribute to the generation of a light field are not reflected from the screen. Therefore, such extraneous light rays will not interfere with or obscure the light field for an observer.

In some embodiments, the spacing between adjacent convex reflective elements 104 may be different in the horizontal direction than in the vertical direction.

One method of fabricating the screen 102 and the convex reflective elements 104 thereon may include injection molding. The entire screen 102, including the convex reflective elements 104, may be injection molded as one piece. Alternatively, the convex reflective elements 104 may be fabricated individually using injection molding and then adhered to the face of the screen 102 to form the array.

FIG. 2b is a partial side view illustration of the screen 102. Four of the rows of the plurality of convex reflective elements 104 in the two-dimensional array are shown.

FIG. 2c is a partial top view illustration of the screen 102. Four of the columns of the plurality of convex reflective elements 104 in the two-dimensional array are shown.

As can be seen from the example embodiments of FIGS. 2b and 2c, the convex reflective elements 104 may not be exactly hemispherical. The shape illustrated in FIGS. 2b and 2c may prevent light from being reflected amongst one or more of the convex reflective elements. Such reflections may be unnecessary or even degrade the quality of the light field output by the light field projection system. Additional shapes are possible, in various embodiments; some of which are depicted in FIGS. 3a-3d.

FIG. 2d illustrates a possible coordinate system with respect to the screen 102 that defines light field quadruples (x, y, φ, and θ). For instance, the 4 coordinates of the quadruple may represent one light ray 202 reflected from one of the convex reflective elements 104 to produce the light field. The horizontal axis, in the plane of the screen, may represent the x-coordinate along the screen (with positive x being toward the right). Similarly, the vertical axis, in the plane of the screen, may represent the y-coordinate along the screen (with positive y being toward the top). The angle in the plane of the screen 102 (i.e., the azimuthal angle) may range from 0 to 360 degrees counterclockwise, beginning in the first quadrant of the x-y plane. The angle of the quadruple normal to the screen 102 (i.e., the elevation angle) may range from 90 degrees (exactly normal to the plane of the screen 102) to 0 degrees (exactly parallel to the plane of the screen 102).

Figure 3A:
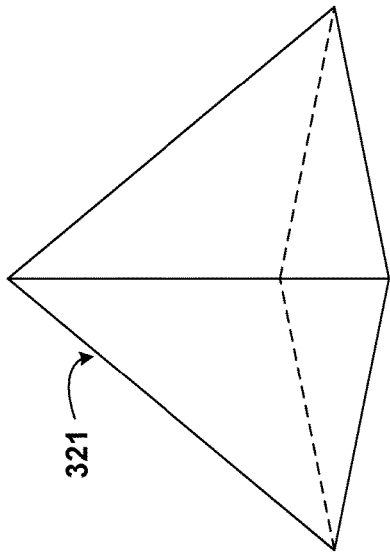
FIGS. 3a-3d are illustrations of various convex reflective elements, according to example embodiments.

FIG. 3a is a side view illustration of a first possible shape 311 for the convex reflective elements 104. The first possible shape 311 is substantially hemispherical. The first possible shape 311 may be similar to the shape of the convex reflective elements 104 as illustrated in the embodiment of FIGS. 1 and 2. The first possible shape 311 illustrated in FIG. 3a may represent a substantially smooth, domed surface. The surface of the first possible shape 311 may allow for a continuous (as opposed to a discrete) distribution of azimuthal angles and elevation angles (within a defined range) at which light can be reflected from the convex reflective element 104.

Figure 3B:
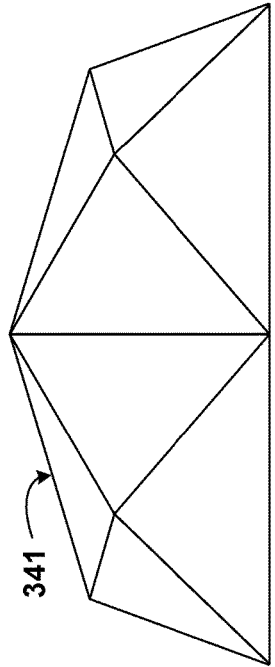

FIG. 3b is an isometric illustration of a second possible shape 321 for the convex reflective elements 104. The second possible shape 321 is pyramidal. The dotted lines depict the back, bottom corners of the convex reflective element 104 that are hidden from view. The surface of the second possible shape 321 may provide a defined, discrete distribution of azimuthal angles (e.g., four different azimuthal angles at 0 degrees, 90 degrees, 180 degrees, and 270 degrees) with a single elevation angle (e.g., 45 degrees) at which light can be reflected from the convex reflective element 104.

Figure 3C:
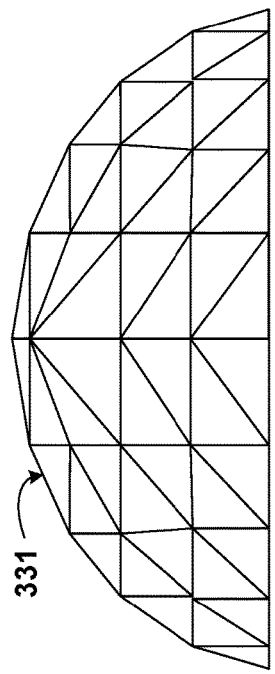

FIG. 3c is a side view illustration of a third possible shape 331 for the convex reflective elements 104. The third possible shape 331 is faceted in an orderly fashion. The surface of the third possible shape 331 may allow for a discrete, evenly spaced distribution of azimuthal angles (e.g., 0 to 360 degrees spaced in 3 degree increments) with a discrete, evenly spaced distribution of elevation angles (e.g., 5 degrees to 90 degrees spaced in 1 degree increments) at which light can be reflected from the convex reflective element 104.

Figure 3D:
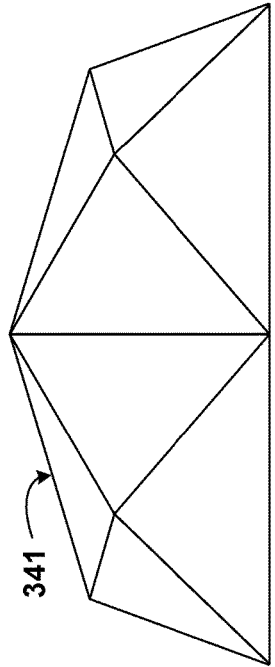

FIG. 3d is a side view illustration of a fourth possible shape 341 for the convex reflective elements 104. The fourth possible shape 341 is faceted in an irregular fashion. The surface of the fourth possible shape 341 may allow for a discrete, unevenly spaced distribution of azimuthal angles (e.g., eight different select angles from 0 to 360 degrees) with a discrete, unevenly spaced distribution of elevation angles (e.g., four different select angles from 1 to 90 degrees) at which light can be reflected from the convex reflective element 104.

Figure 4:
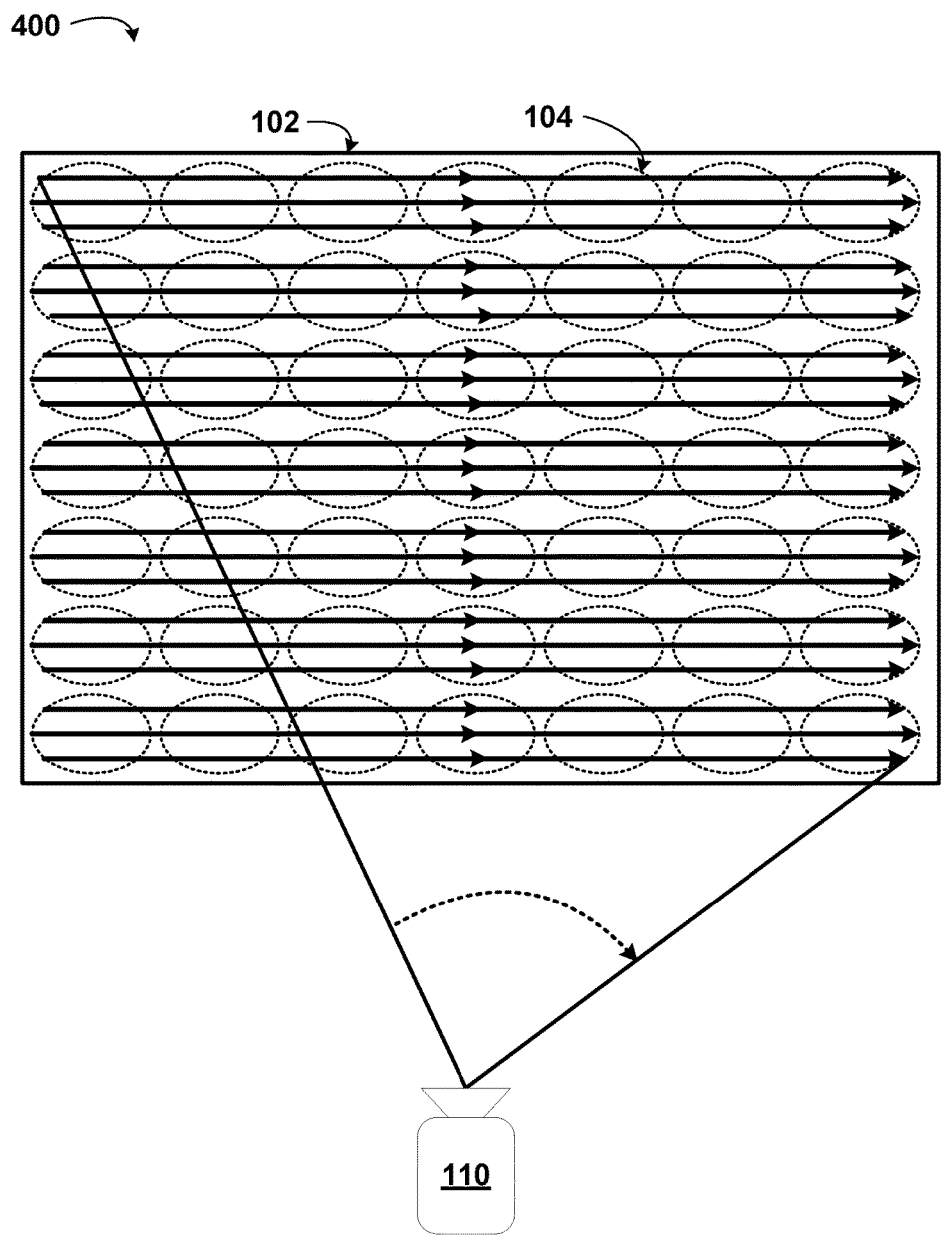
FIG. 4 is an illustration of a method of scanning convex reflective elements, according to example embodiments.

FIG. 4 is an illustration of a method 400 of sequentially scanning the convex reflective elements 104 on the screen 102 using the projection unit 110. The number of convex reflective elements 104 on the screen 102 illustrated in FIG. 4 is provided as an example, and may not reflect the preferred number of convex reflective elements 104 in an actual system. The convex reflective elements 104 on the screen 102 may be sequentially scanned, as illustrated in FIG. 4, by reflecting light emitted from the light source 112 within the projection unit 110 off of the horizontally rotating movable mirrored element 118 and off of the vertically rotating movable mirrored element 120 toward the screen 102. The sequential scanning method 400 of FIG. 4 may provide a light field that is concurrently viewable from a plurality of perspectives.

In the example embodiment illustrated in FIG. 4, the method 400 includes sweeping the light emitted from the light source 112 from left to right, horizontally, across the screen 102. Next, the method 400 includes moving down to a second vertical location on the screen 102 and again sweeping that horizontal path using light emitted from the light source 112 from left to right. After, the method 400 includes moving down to a third vertical location on the screen 102. These steps may repeat until light has been reflected from the bottom-rightmost location on the screen 102 from which light is reflected to generate a light field. To achieve a scanning pattern as depicted in FIG. 4, the horizontally rotating movable mirrored element 118 may be rotating at a higher rate than the vertically rotating movable mirrored element 120, in some embodiments.

In various embodiments, the light from the light source 112 may be swept across the convex reflective elements 104 in a continuous manner or at discrete points, depending on the design of the horizontally rotating movable mirrored element 118 and the vertically rotating movable mirrored element 120. For example, if the horizontally rotating movable mirrored element 118 includes a mirror wrapped around a rotating cylinder, and the mirror has a continuously varying angle, the horizontal portion of the scan may be continuous from left to right, as illustrated in FIG. 4. Further, to generate the scanning pattern illustrated in FIG. 4, the vertically rotating movable mirrored element 120 may be faceted such that only specific vertical locations on the screen 102 are scanned. In alternate embodiments, the horizontal scanning lines may be segmented due to a discrete horizontal scan occurring, as opposed to a continuous scan. Further, in alternate embodiments, the vertical locations of the horizontal scans may be more densely or less densely packed than in FIG. 4. Furthermore, the horizontal density and/or vertical density with which the light ray projection locations on the screen 102 occur may serve to define an effective "resolution" of the generated light field.

Additionally, alternate scanning patterns are possible, in various embodiments. For example, each horizontal scan may occur from right to left, and be reset after every horizontal line back to the right end of the screen 102. As an additional alternative, a sequential scan of the screen 102 may occur from the bottom of the screen 102 upward rather than from the top of the screen downward. Still further, the scan could be wholly irregular, appearing to jump from one random location on a given convex reflective element 104 to another, based on the design of the one or more movable mirrored elements 118/120 (e.g., facets covered with mirrors on the movable mirrored elements 118/120 are not placed angularly sequentially around the perimeter of the movable mirrored elements 118/120, thus the light ray emitted from the projection unit 110 may appear to illuminate the screen 102 in an irregular pattern). In addition, rather than tracing out the scanned pattern from top to bottom, line by line (i.e., performing a progressive scan), the projection unit 110 could skip every other line and then come back and fill in the skipped lines (i.e., perform an interlaced scan, similar to the way in which cathode ray tubes, CRTs, perform interlaced scans).

Still further, the rate at which the method 400 scans the entirety of the screen 102 may vary based on a modulation scheme determined by a control system 116 within the projection unit 110. The rate may also depend on the rotational speed of one or more movable mirrored elements 118/120, for example. The rate at which the scan occurs determines the rate at which a generated light field is refreshed when viewed from a plurality of perspectives. Due to the phenomenon referred to as "the persistence of vision", the light field projection system 100 may be used to generate light fields that represent a moving scene to an observer. In such embodiments, the light field refresh rate may be at least 24 Hz to ensure a "persistence of vision" by observers of the light fields. In some embodiments, the scan refresh rate may be higher than 24 Hz. For example, in embodiments where an additional scan of the screen 102 occurs for each of three primary colors (red, green, and blue, for example) to generate multiple light fields of different colors, and thereby recreate a color scene for an observer, the refresh rate may be at least 72 Hz (24 Hz times 3 for each color). Alternatively, a separate scan for each of three primary colors could occur simultaneously using three projection units in parallel. Each of the separate scans may refreshed at 24 Hz, and then multiplexed together, allowing the recreation of a moving color scene for an observer.

Figure 5A:
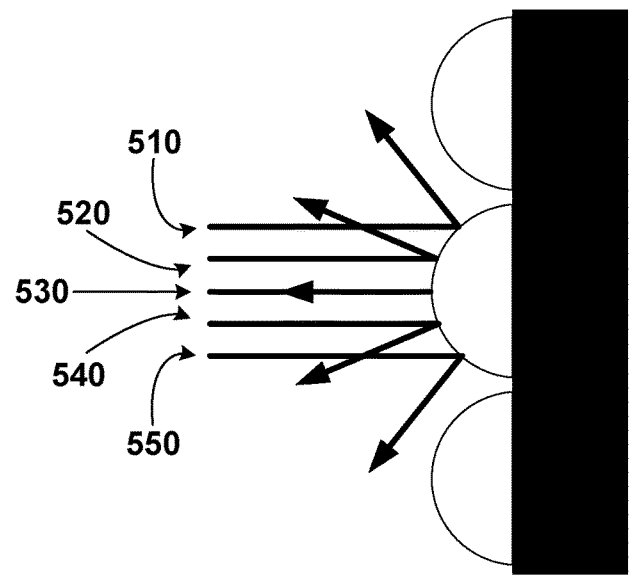
FIGS. 5a and 5b are illustrations of light rays occurring during a scanning of convex reflective elements (side view and top view, respectively), according to example embodiments.

FIG. 5a is a side view illustration of light rays 510, 520, 530, 540, 550 occurring during a horizontal scan of five different latitudinal positions on the convex reflective elements 104, similar to five of the horizontal scan lines occurring in FIG. 4. Different from FIG. 4, however, is the fact that there are five horizontal scans occurring across each convex reflective element 104, rather than three horizontal scans.

Each light ray 510, 520, 530, 540, 550 represents multiple light rays projected at various horizontal positions along the screen 102 (or longitudinal position along the individual convex reflective element 104) but at the same respective vertical position along the screen 102 (or latitudinal position along the individual convex reflective element 104).

Figure 5B:
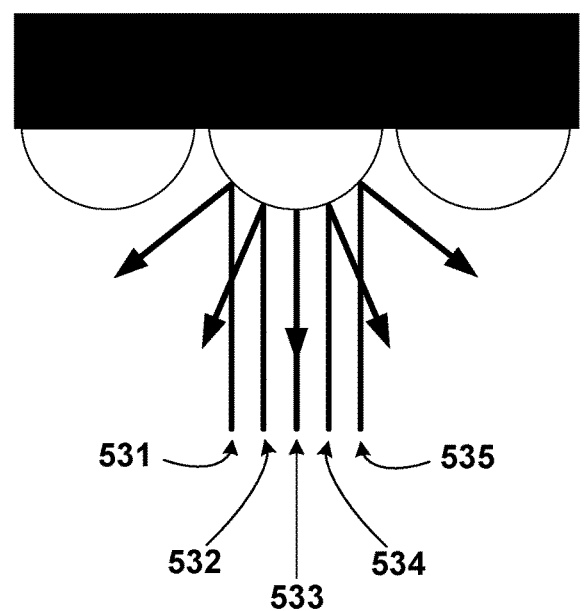

For example, as shown in FIG. 5b (a top view illustration), the light ray 530 represented in FIG. 5a is projected along the corresponding row of convex reflective elements 104 at longitudinal positions 531, 532, 533, 534, 535. The longitudinal positions 531, 532, 533, 534, 535 may be based on the angle of projection of light emitted from the projection unit 110. The five consecutive angles of projection used to emit light to the five longitudinal positions 531, 532, 533, 534, 535, for example, may be defined by five consecutive faceted reflectors at different angles along the perimeter of the horizontally rotating movable mirrored element 118. Because, in the embodiments illustrated in FIGS. 5a and 5b, the convex reflective elements 104 are substantially hemispherical, each pair of latitudinal position and longitudinal position on a single convex reflective element 104 produces a reflection at a different pair of azimuthal and elevation angles. The use of five latitudinal positions and five longitudinal positions is by way of example, and may not reflect the preferred number of positions in an actual system for an individual convex reflective element 104.

Figure 6:
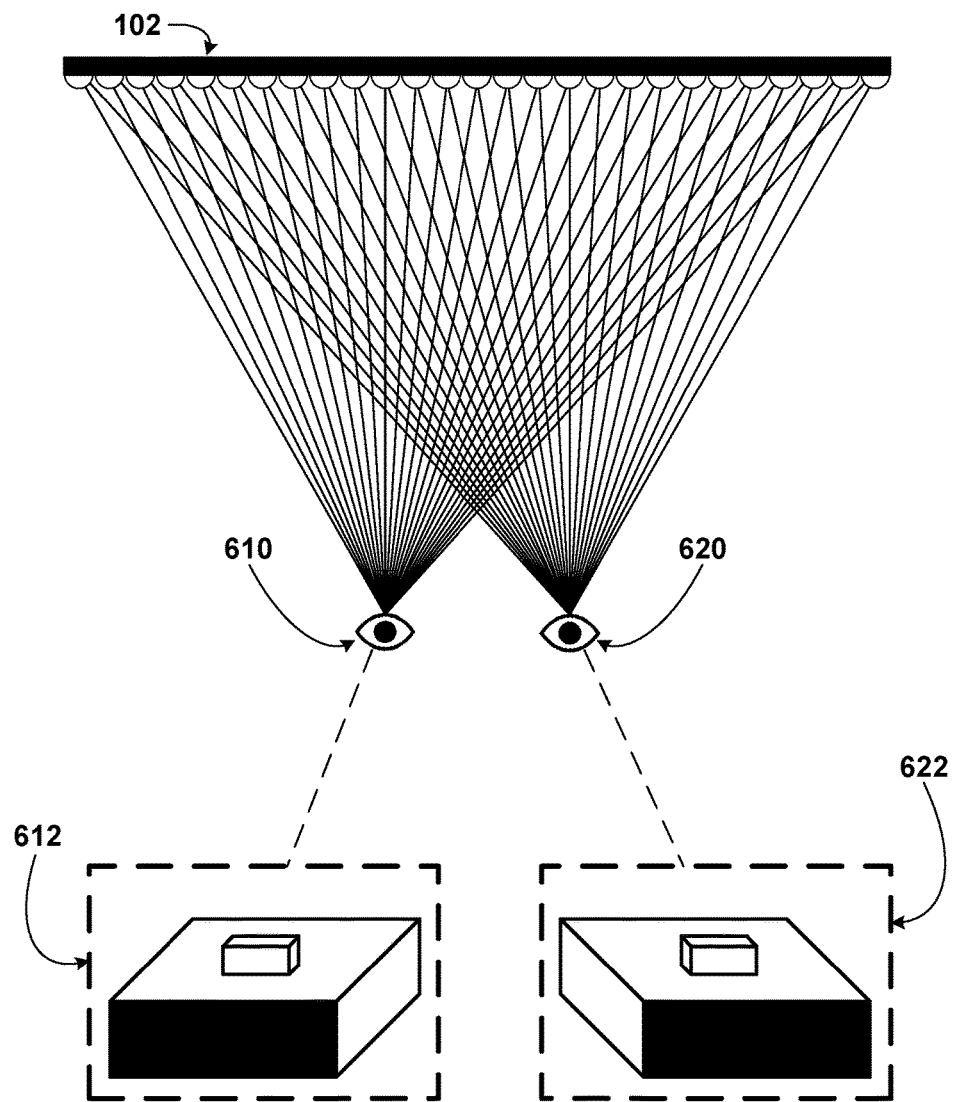
FIG. 6 is an illustration of two perspective views of a light field, according to example embodiments.

FIG. 6 is an illustration of two perspective views 612, 622 of a scene (e.g., one block on top of another) recreated by a light field. The orientation of the two observers 610, 620 viewing the reflections with respect to the screen 102 is displayed from above. The two observers 610, 620 are at different x-locations (i.e., horizontal locations) with respect to the screen coordinates. Each observer 610, 620 may receive one or more reflections from each of the convex reflective elements 104 on the screen 102. Because the screen 102 may include a 2D array of convex reflective elements 104, the number of convex reflective elements 104 providing reflections may be more than is shown in FIG. 6, as FIG. 6 is a top-view. The more densely packed and the smaller the convex reflective elements 104, the more the light field generated by the light field projection system may appear to represent a full, continuous light field to the observers 610, 620. The light field responsible for the two perspective views 612, 622 in FIG. 6 may be projected by a light field projection unit 110.

The perspective view from the left 612 illustrates how the observer 610 on the left may perceive the light field. Similarly, the perspective view from the right 622 illustrates how the observer 620 on the right may perceive the light field. If the two observers 610/620 were close enough to one another (e.g., if the two observers 610/620 were two eyes of a person), a binocular view of the scene may be created. Such a binocular view may create a stereoscopic 3D image for the union of the two observers 610/620.

The reason that the perspective view from the left 612 and the perspective view from the right 622 produce different views of the scene is because the two perspective views 612/622 are receiving different light rays from different angles reflected off of the screen 102. Each of the two observers 610/620 is located at a different set of quadruples (sets of x, y, φ, and θ) within the light field that is reflected from the screen 102. The light field may be projected by a projection unit 110, for example, such that each respective quadruple correctly recreates a perception of the scene from that quadruple. For example, a control system 116 within a projection unit 110 may determine a modulation scheme for a modulator 104 such that the light rays modulated according to the modulation scheme properly reconstruct the scene for each of the two observers 610/620.

If the location of one or both of the observers 610/620 changed, the respective observer may be located at a new set of quadruples (sets of x', y', φ', and θ') within the light field. Thus, the perception of the scene from the new quadruples may be different than the perception of the scene from the original quadruples. This is similar to the way the perspective view from the left 612 of the scene is different from the perspective view from the right 622 of the scene. Alternatively, the observers 610/620 could be located at different y-locations (i.e., vertical locations) with respect to the screen 102. An example of such an orientation of observers is illustrated and described with respect to FIG. 7.

Figure 7:
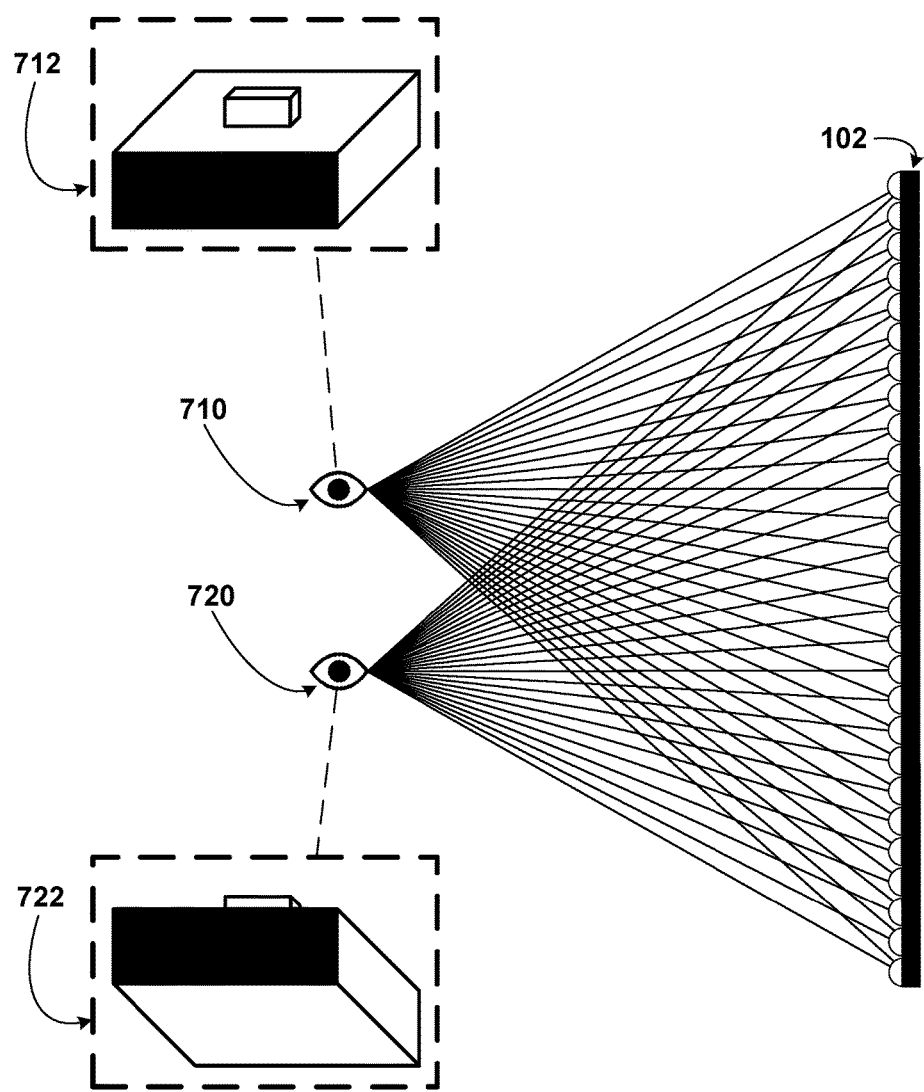
FIG. 7 is an illustration of two perspective views of a light field, according to example embodiments.

FIG. 7 is an illustration of two perspective views 712, 722 of a scene (e.g., one block on top of another) recreated by a light field. The orientation of the two observers 710, 720 viewing the reflections from the screen 102 is displayed from the right side. The two observers 710, 720 are at different y-locations with respect to the screen coordinates. Each observer 710, 720 may receive a reflection from each of the convex reflective elements 104 on the screen 102. The more densely packed and the smaller the convex reflective elements 104, the more the light field generated by the light field projection system may appear to represent a full, continuous light field to the observers 710, 720

The light field generating the two perspective views 712, 722 in FIG. 7 may be projected by a light field projection unit 110.

The perspective view from the top 712 illustrates how the observer 710 on the top may perceive the light field. Similarly, the perspective view from the bottom 722 illustrates how the observer 720 on the bottom may perceive the light field. If the two observers 710/720 were close enough to one another (e.g., if the two observers 710/720 were two eyes of a person), a binocular view of the scene may be created. Such a binocular view may create a stereoscopic 3D image for the union of the two observers 710/720.

The reason that the perspective view from the top 712 and the perspective view from the bottom 722 produce different views of the scene is because the two perspective views 712/722 are receiving different light rays from different angles reflected off of the screen 102. Each of the two observers 710/720 is located at a different set of quadruples (sets of x, y, $\varphi$, and $\theta$) within the light field that is reflected from the screen 102. The light field may be projected by a projection unit 110, for example, such that each respective quadruple correctly recreates a perception of the scene from that quadruple. For example, a control system 116 within a projection unit 110 may determine a modulation scheme for a modulator 104 such that the light rays modulated according to the modulation scheme properly reconstruct the scene for each of the two observers 710/720.

If the location of one or both of the observers 710/720 changed, the respective observer may be located at a new set of quadruples (sets of x', y', $\varphi$', and $\theta$') within the light field. Thus, the perception of the scene from the new quadruples may be different than the perception of the scene from the original quadruples. This is similar to the way the perspective view from the top 712 of the scene is different from the perspective view from the bottom 722 of the scene. Alternatively, the observers 710/720 could be located at different x-locations (i.e., horizontal locations) with respect to the screen 102. An example of such an orientation of observers is illustrated and described with respect to FIG. 6.

Furthermore, the observers 710/720 could be located at both different x-locations and different y-locations with respect to one another. In this case, the differences between the perspective views of the scenes shown in FIGS. 6 and 7 may be superposed.

In some embodiments, certain quadruples of the light field may be generating different scenes, entirely. For example, the light field may be projected by the projection unit 110 such that any quadruples with an azimuthal angle ($\varphi$) of 0 to 180 degrees will reproduce a mountain scene when viewed by an observer, whereas any quadruples that have an azimuthal angle ($\varphi$) of 180 to 360 degrees will reproduce an ocean scene. This would allow observers above a certain vertical location with respect to the screen 102 to perceive one scene (e.g., the mountain scene) and would allow observers below a certain vertical location with respect to the screen 102 to perceive a separate scene (e.g., the ocean scene). This could alternately be done based on the horizontal location of the observer by instead varying the azimuthal angle ($\varphi$) range of the mountain scene from 0 to 90 degrees and 270 to 360 degrees and the azimuthal angle ($\varphi$) range of the ocean scene from 90 to 270 degrees.

Figure 8:
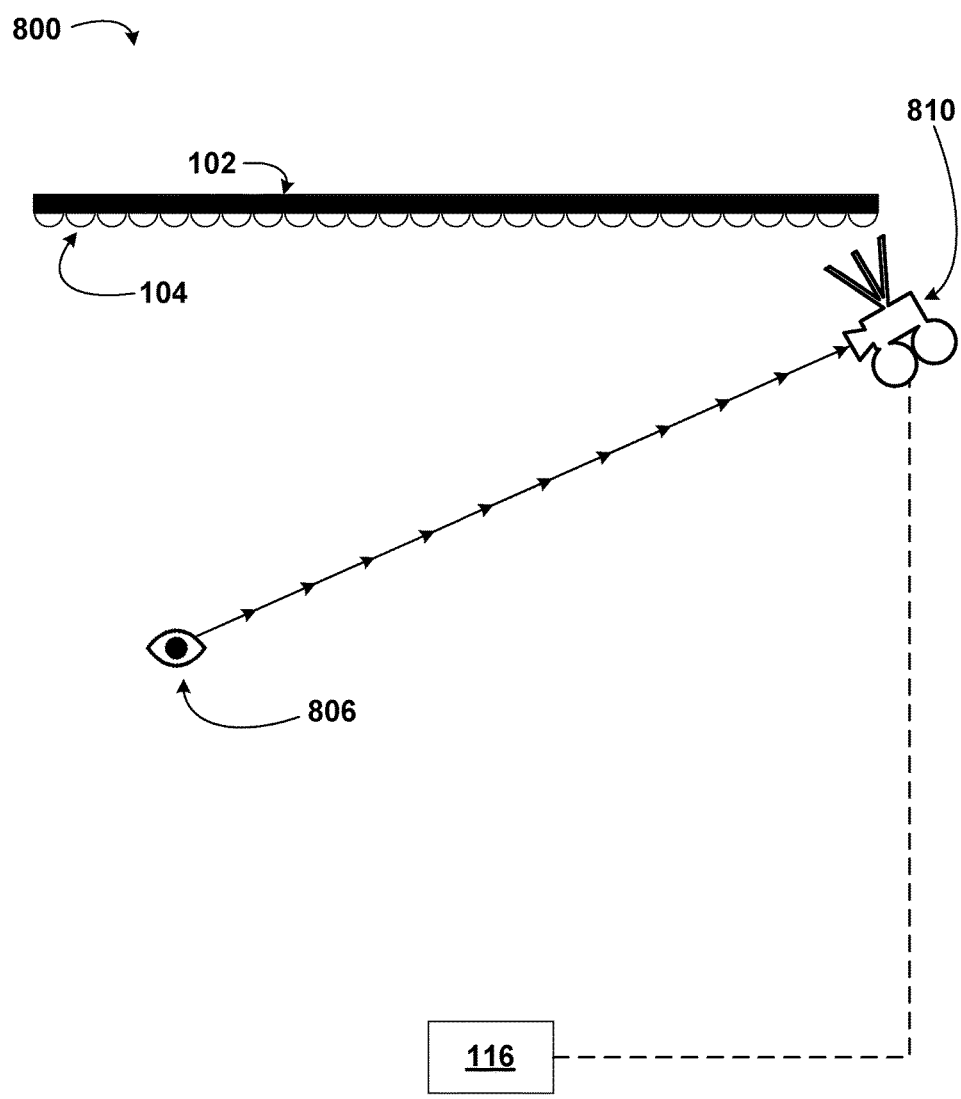
FIG. 8 is an illustration of a light field projection system, according to example embodiments.

FIG. 8 is an illustration of a light field projection system 800. The light field projection system 800 is similar to that illustrated in FIG. 1. Please consult FIG. 1 and accompanying description for more information regarding the screen 102, the convex reflective elements 104, and the projection unit 110 (including the control system 116). However, in the light field projection system 800 of FIG. 8, a location of an observer 806 may be tracked by a location tracking device 810. The dashed line in FIG. 8 represents a communicative coupling between the location tracking device 810 and the control system 116.

The location tracking device 810 may be an infrared sensor, a low-power laser system, or a camera, in various embodiments. The location tracking device 810 may identify, relative to the screen 102, the location of the observer 806. This may include the location tracking device 810 determining one or more quadruples of a generated light field that the observer 806 could perceive at its given location. Upon identifying the location of the observer 806, the location tracking device 810 may transmit a notification to the control system 116 indicating the location of the observer 806. This may be done by a wireline communication (e.g., over an Ethernet or universal serial bus—USB cable) or wireless communication (e.g., using Bluetooth® or WiFi—IEEE 802.11 standards), for example. In some embodiments, the location tracking device 810 may be a part of the screen 102. In alternate embodiments, the location tracking device 810 may be part of the projection unit 110. In still further embodiments, the location tracking device 810 may operate independently and transmit the results to the control system 116, as illustrated in FIG. 8.

Upon receiving the location of the observer 806, the control system 116 may modify a modulation scheme for use by the modulator 114 to generate the light field. For example, if the observer 806 constitutes all of the potential quadruples of the light field at which the light field will be viewed (e.g., the observer 806 is the only one perceiving the light field), the modulator 114 need not modulate light to generate other regions of the light field. This may reduce the calculation time (i.e., rendering time) for the control system 116 to determine a modulation scheme to reproduce the scene as a light field for different perspectives, because many possible perspectives need not be rendered. Furthermore, certain portions of the screen 102 and certain portions of each convex reflective element 104 may not need to be illuminated. This could conserve energy usage by the projection unit 110.

In some embodiments, the location tracking device 810 may be configured to track the locations of multiple observers. The location tracking device 810 may then transmit multiple locations to the control system 116, thereby permitting the control system to determine a modulation scheme that would produce a light field viewable from a plurality, but not all possible, perspectives. Further, the location tracking device 810 may track two observer locations where each observer location corresponds to a person's left or right eye. Upon transmitting these two locations to the control system 116, the control system 116 could determine a modulation scheme that would project a light field viewable from the perspective (i.e., collection of one or more quadruples with respect to the light field) of both eyes. This may permit the projection unit 110 to project a light field that appears stereoscopically 3D to a viewer while only modulating the light field so that it is viewable in two, rather than all possible, viewing locations.

Similarly, the location of multiple separate observers could be tracked by the location tracking device 810 to permit a scene change within the light field. For example, the location tracking device 810 may transmit the location of two users to the control system 110. The control system 110 may then determine a modulation scheme to generate a light field that creates a different scene for each observer (e.g., one observer perceives a mountain scene and one perceives an ocean scene). As an additional application, if the projection system 100 were used to play a game, one observer could be shown her poker hand while the second observer was shown his poker hand, without each being able to see the other's poker hand. Furthermore, this may allow the control system 116 to determine a modulation scheme that produces a light field with a variation in intensity or produces multiple light fields that vary in color at different observing locations. Such variations could accommodate viewers who are partially blind and/or are color blind while not altering the viewing experience of viewers who do not have such visual impairments.

Figure 9:
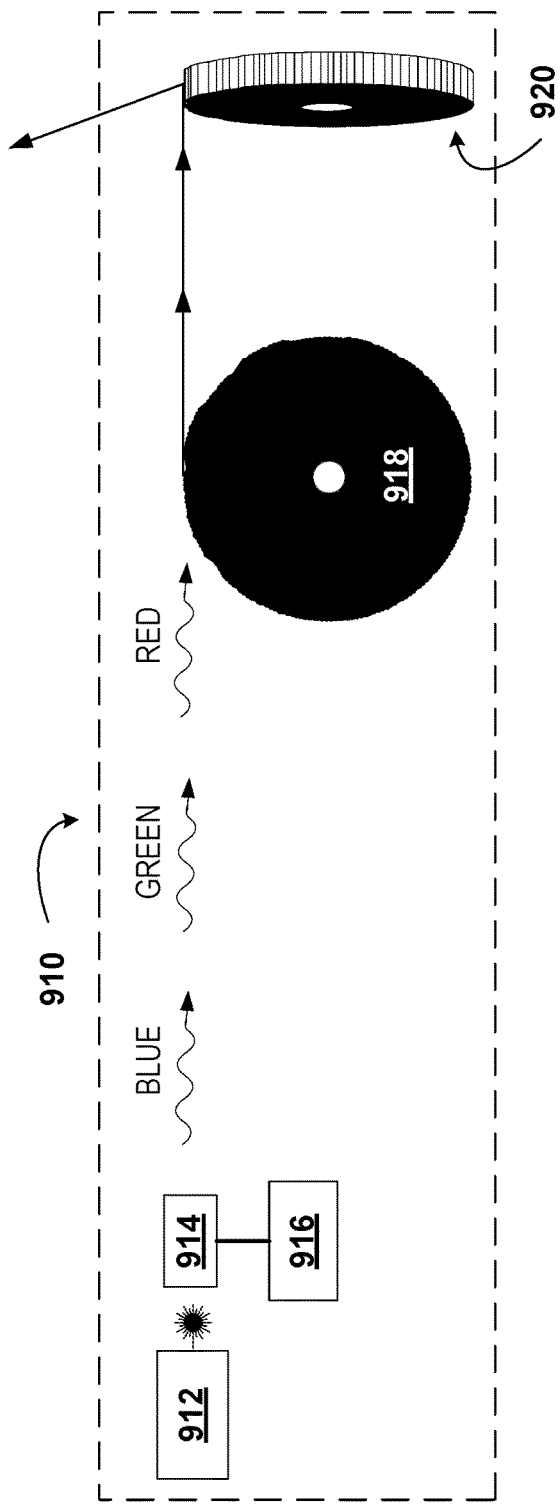
FIG. 9 is an illustration of a method of generating light fields of different colors, according to example embodiments.

FIG. 9 is an illustration of a method of generating light fields of different colors with a projection unit 910. The projection unit 910 is analogous to the projection unit 110 illustrated in FIG. 1, please consult FIG. 1 and the accompanying description for more detail regarding the projection unit 910. Similar to the projection unit 110 illustrated in FIG. 1, the projection unit 910 has a light source 912, a modulator 914, a control system 916, and two movable mirrored elements 918/920. Unlike the projection unit 110 illustrated in FIG. 1, though, the projection unit 910 illustrated in FIG. 910 is configured to produce light fields of different frequencies.

One method of producing light fields of different colors may include multiplexing the light fields in time, as illustrated in FIG. 9. More specifically, a red light ray may be emitted toward the horizontally rotating movable mirrored element 918, and then reflect off the horizontally rotating movable mirrored element 918 and the vertically rotating movable mirrored element 920. This red light ray is then reflected off the screen 102 at a later time. Before one or both of the mirrored elements 918/920 rotate to display their next facet, however, a green light ray may follow the same path the red light ray followed and reflect off the same location on the screen 102. Similarly for a blue light ray. These three colors (red, green, and blue—RGB) may then be perceived by an observer as overlapping, given that they are reflected off of the screen 102 at the same quadruple and at roughly the same time. Hence, the three quadruples of disparate light fields may appear to the observer as a single quadruple of one "colored light field". Given the weighted light intensity of each of the red, green, and blue rays, multiple other colors can be generated that are perceivable by an observer.

The method for multiplexing the three, or more, colored light rays in time may include three consecutive light rays of different colors being generated by the light source 912. Alternatively, the light source 912 may generate white light and then have a selective filter for the three, or more, different colors that is modulated at a 33% duty cycle for each color (using the three color example of FIG. 9) and offset in time, one from the next, by 33%. In other embodiments, the modulator 914 may instead have a frequency filter. Further, the modulator 914 may have other means of modulating the frequency of the light emitted by the light source 912. Additionally, a modulation scheme encoded by the control system 916 may include frequency modulation of the light emitted by the light source 912 in addition to intensity modulation. The frequency selected by such a modulation scheme may be capable of selecting the requisite frequency for the light field within a range of frequencies, rather than selecting one of three colors (e.g., RGB) and attempting to use combinations of those three colors to create alternate colors.

An alternative means of multiplexing multiple light fields of differing frequencies (colors) may involve a different design of the movable mirrored elements 918/920. Rather than the movable mirrored elements 918/920 solely determining the location on the screen 102 at which the light emitted from the light source 912 is directed, the movable mirrored elements 918/920 may also select the frequency of the light they reflect. For example, three consecutive facets on the horizontally rotating movable mirrored element 918 may be angled with respect to the screen 102 at the same angle. However, each of the three consecutive facets may be coated with a different material, each materially selectively reflecting light of a different color (RGB, in an example embodiment analogous to the embodiment illustrated in FIG. 9).

Figure 10:
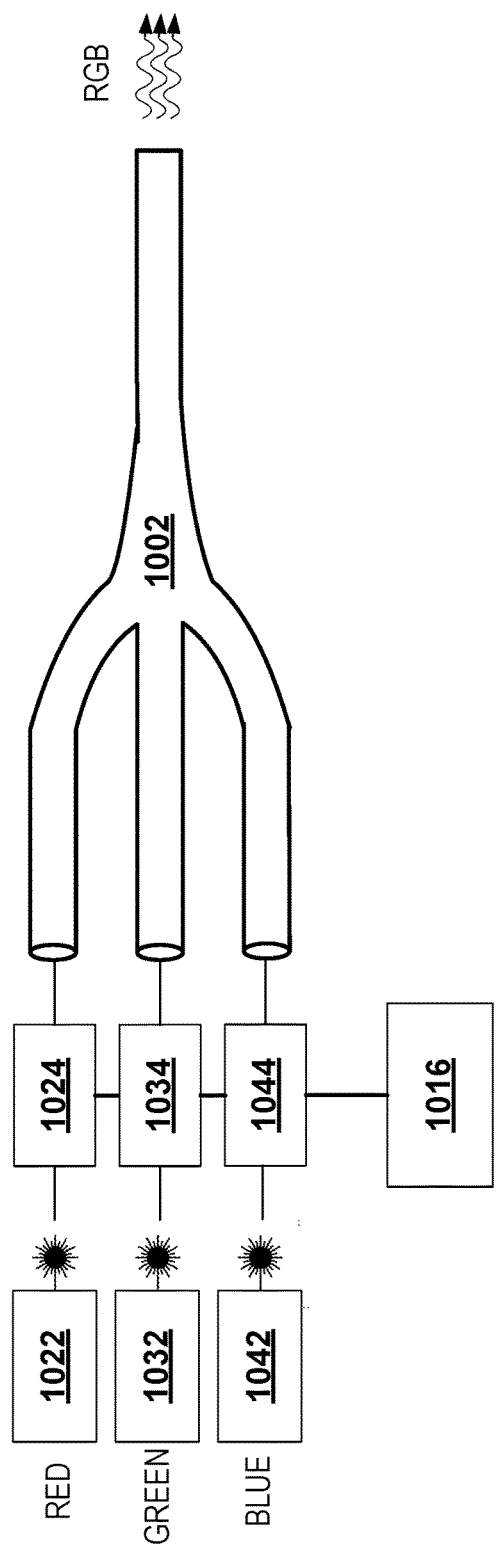
FIG. 10 is an illustration of a method of generating light fields of different colors, according to example embodiments.

FIG. 10 is an illustration of another method of generating light fields of different colors. The components illustrated in FIG. 10 may be part of a larger projection unit. The components include a light combining fiber 1002, a first light source 1022 and a corresponding first modulator 1024, a second light source 1032 and a corresponding second modulator 1034, a third light source 1042 and a corresponding third modulator 1044, and a control system 1016. Similar to the projection units 110, 910 illustrated in FIGS. 1 and 9, respectively, the light output at the end of the light combining fiber 1002 could next be directed to a horizontally rotating movable mirrored element.

The light combining fiber 1002 may be formed of multiple input fibers (e.g., one for each light source 1022, 1032, 1042) spliced together at a fusion splice with a single output fiber. The lengths of the multiple input fibers may be the same, such that the optical path length for light emitted from each of the light sources 1022, 1032, 1042 is the same. In some embodiments, the light combining fiber 1002 may be made of silicon dioxide, for example. In alternate embodiments, free space optics, such as one or more mirrors or one or more lenses, may be used in addition to or in place of the light combining fiber 1002.

The light sources 1022, 1032, 1042 may emit light of differing wavelengths. In the example embodiment illustrated in FIG. 10, the first light source 1022 emits light of a wavelength corresponding to the color red in the visible spectrum. Similarly, the second light source 1032 emits light of a wavelength corresponding to the color green in the visible spectrum and the third light source 1042 emits light of a wavelength corresponding to the color blue in the visible spectrum. The light sources 1022, 1032, 1042 may be lasers, in various embodiments. In some embodiments, there may be more than three light sources 1022, 1032, 1042. For example, there may be six light sources, in some embodiments; one that emits red light, one that emits orange light, one that emits yellow light, one that emits green light, one that emits blue light, and one that emits violet light.

In the example embodiment illustrated in FIG. 10, each of the light sources 1022, 1032, 1042 is modulated by a corresponding modulator 1024, 1034, 1044. Each of the modulators 1024, 1034, 1044 may modulate light according to a modulation scheme determined by the control system 1016. The light may be modulated by each modulator 1024, 1034, 1044 such that a light field is projected off a screen (e.g., the screen 102 illustrated in FIG. 1) corresponding to each of the three colors. These three light fields may be superimposed when perceived by an observer to form one scene with a continuum of colors based on the intensity of each of the base colors (e.g., red, green, and blue). In alternate embodiments, each of the modulators 1024, 1034, 1044 may be independently controlled by a respective control system, rather than jointly by a single control system 1016, as illustrated in FIG. 10.

Figure 11:
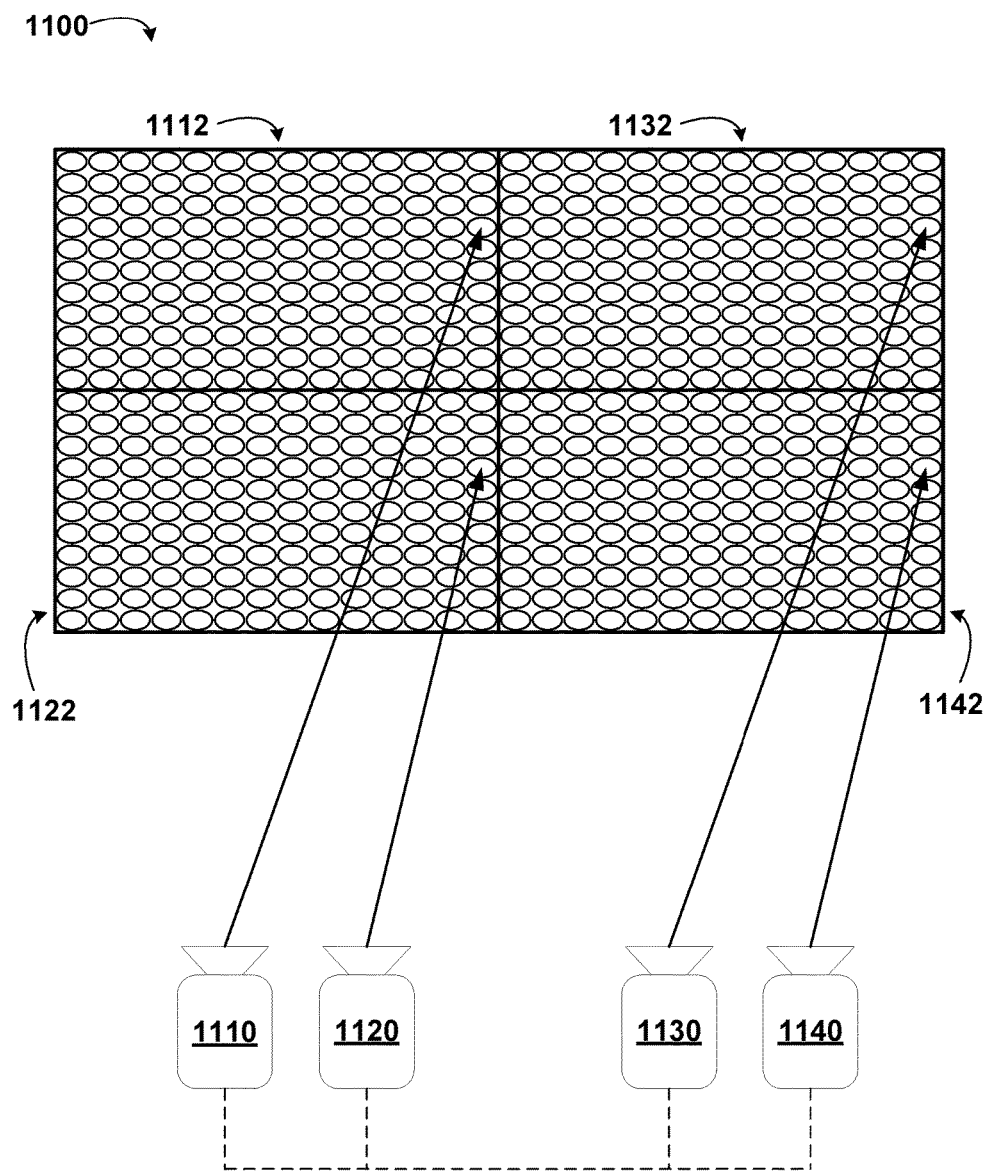
FIG. 11 is an illustration of a light field projection system, according to example embodiments.

FIG. 11 is an illustration of a light field projection system 1100. The light field projection system 1100 may comprise multiple subsystems that are similar to the light field projection system 110 illustrated in FIG. 1 tiled together such that the corresponding screens are adjacent. The light field projection system 1100 includes a first screen 1112 and a corresponding first projection unit 1110, a second screen 1122 and a corresponding second projection unit 1120, a third screen 1132 and a corresponding third projection unit 1130, and a fourth screen 1142 and a corresponding fourth projection unit 1140. The embodiment illustrated in FIG. 11 may permit borderless tiling of multiple screens to widen an area of permitted perspectives for viewing. In some embodiments, the projection units 1110, 1120, 1130, 1140 may sequentially scan the respective screens 1112, 1122, 1132, 1142 in different fashions (e.g., the projection unit 1110 may scan the corresponding screen 1112 from left-to-right, top-to-bottom and the projection unit 1120 may scan the corresponding screen 1122 from right-to-left, bottom-to-top).

The individual screens 1112, 1122, 1132, 1142 and the individual projection units 1110, 1120, 1130, 1140 may be analogous to the screen 102 and the projection unit 110 illustrated in FIG. 1, for example. However, in some embodiments of the light field projection system 1100 of FIG. 11, the screens 1112, 1122, 1132, 1142 and the projection units 1110, 1120, 1130, 1140 may work in tandem to produce a single light field (i.e., the range of x-coordinates and y-coordinates possible is increased given the increased size of the super-screen formed by the four individual screens 1112, 1122, 1132, 1142 disposed adjacent to one another). Such a single light field may reproduce one or more scenes concurrently viewable from various observer perspectives (analogous to the embodiment illustrated in FIG. 1). In order to accomplish this, control systems of the projection units 1110, 1120, 1130, 1140 may communicate with one another to determine a modulation scheme for each of the modulators within the respective projection units 1110, 1120, 1130, 1140. Additionally, because each of the projection units 1110, 1120, 1130, 1140 may only be rendering one-quarter of a given scene, the computational burden placed on each of the control systems within the respective projection units 1110, 1120, 1130, 1140 may be reduced compared to an embodiment in which each respective projection unit 1110, 1120, 1130, 1140 reproduced the entire given scene. Furthermore, in some embodiments, there may be an additional control system that is configured to divvy up a scene into smaller sub-scenes that are projected by each projection unit 1110, 1120, 1130, 1140. In alternate embodiments, there may be a single control system that determines the modulation scheme for use by the modulator within each of the projection units 1110, 1120, 1130, 1140, thereby replacing the respective control system within each respective projection unit 1110, 1120, 1130, 1140.

In alternate embodiments, a single projection unit (e.g., projection unit 1110) could project across all four projection screens 1112, 1122, 1132, 1142. In such an embodiment, the projection unit 1110 may project one-quarter of the perspectives. For example, the projection unit 1110 may project only those perspectives corresponding viewable by observers located to the right of the projection screens 1112, 1122, 1132, 1142 (e.g., those perspectives from azimuthal angles, φ, that are between 0 and 45 degrees or 315 and 360 degrees). Such an embodiment could permit an expansion of the viewable region for the corresponding one-quarter of the perspectives without requiring additional projection burden on the projection unit 1110 and without requiring additional projection units.

Figure 12:
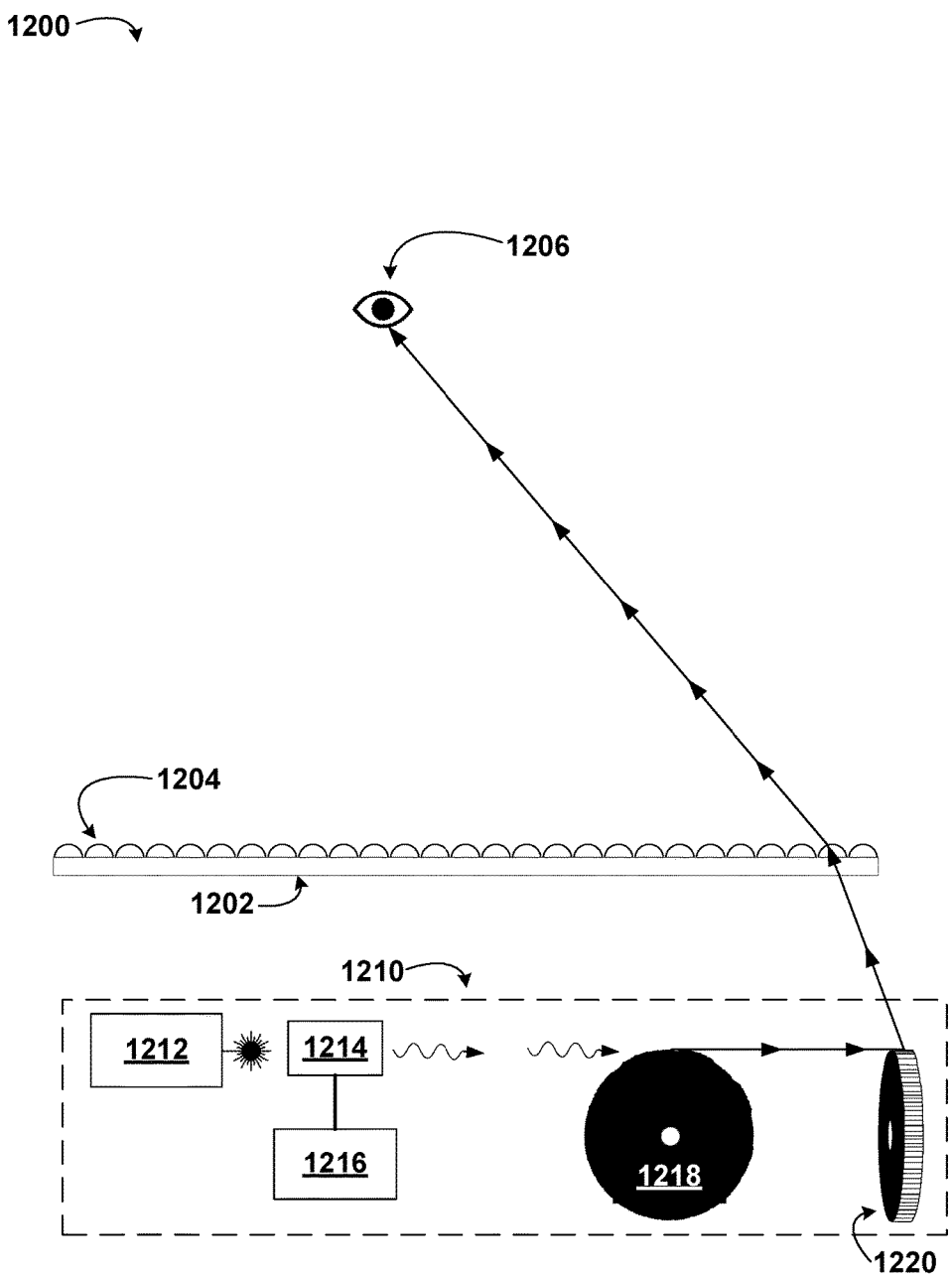
FIG. 12 is an illustration of a light field projection system, according to example embodiments.

FIG. 12 is an illustration of a light field projection system 1200. The light field projection system 1200 includes a screen 1202, with a plurality of concave refractive elements 1204 arranged into a two-dimensional array thereon, an observer 1206, and a projection unit 1210. The projection unit 1210 includes a light source 1212, a modulator 1214, a control system 1216, and movable mirrored elements 1218/1220. The light field projection system 1200 has a projection unit 1210 analogous to the projection unit 110 illustrated in FIG. 1. Please consult FIG. 1 and the accompanying description for more details regarding the light source 1212, the modulator 1214, the control system 1216, or the movable mirrored elements 1218/1220. The primary difference of the embodiment of the light field projection system 1200 illustrated in FIG. 12, however, is that the screen 1202, has concave refractive elements 1204 thereon, and lies between the projection unit 1210 and the observer 1206. The light field projection system 1200 illustrated in FIG. 12 may be spatially more compact, than the embodiment 100 illustrated in FIG. 1.

The concave refractive elements 1204 refract light projected by the projection unit 1210 to produce a light field. Analogous to the convex reflective elements 104, the concave refractive elements 1204 may be sequentially scanned by the projection unit 1210 and disperse light to project a light field (e.g., a light field that represents a scene when viewed from the respective perspective of the observer 1206, for example). The concave refractive elements 1204 may be, for example, substantially hemispherical lenses. The concave refractive elements 1204 may be fabricated of fused quartz, fluorite, or acrylic, in example embodiments.

III. Example Processes

Figure 13:
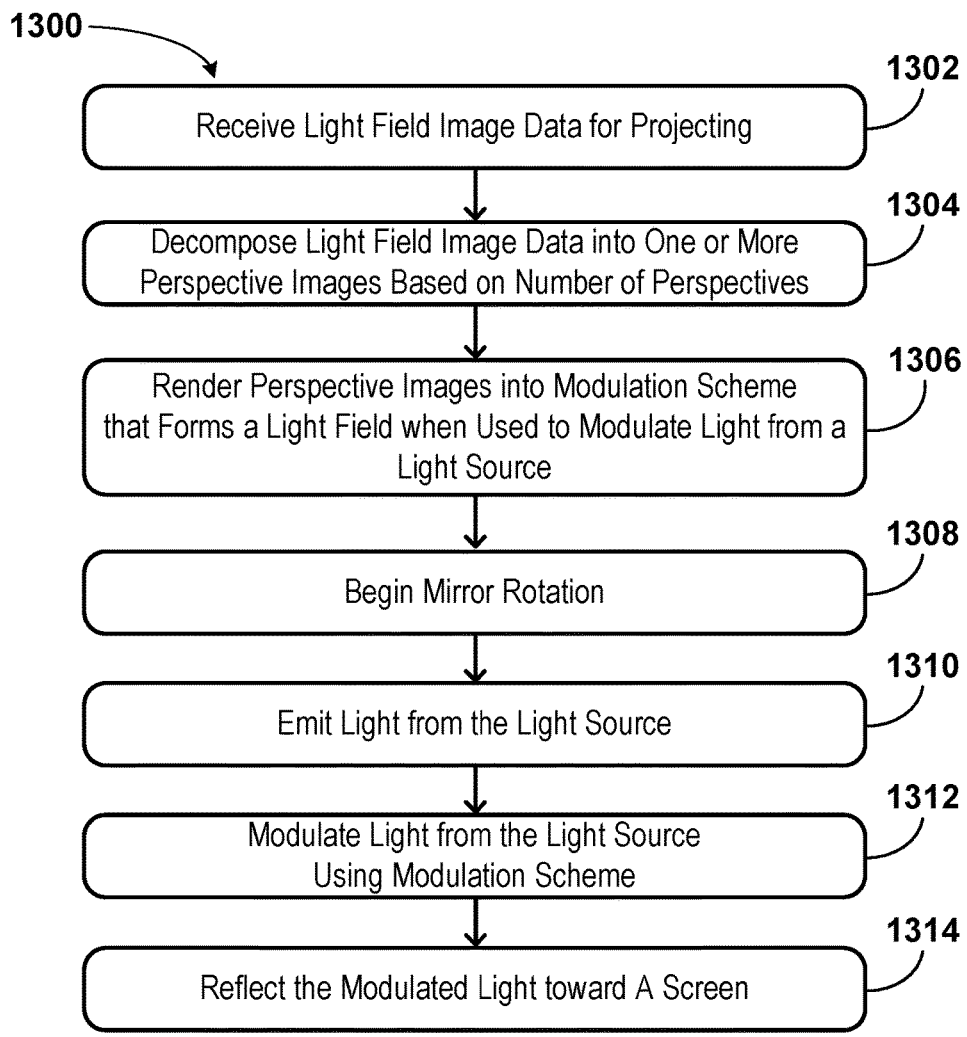
FIG. 13 is a flow chart illustration of a method, according to example embodiments.

FIG. 13 is a flow chart illustration of a method of generating a light field 1300, according to example embodiments. The method of generating the light field 1300 may be used to recreate one or more scenes that are viewable from a plurality of perspectives. Furthermore, the method of generating the light field 1300 may be performed by a projection unit of a light field projection system.

At step 1302, the method 1300 includes receiving light field image data for projecting. The light field image data may be retrieved by a processor in a control system 116 from a non-transitory computer-readable medium within the control system 116, for example. Alternatively, the light field image data may be transmitted to the control system 116 of the projection unit 110 by another device (e.g., over the public Internet). In some embodiments, the light field image data will be a single light field frame of a larger light field video data stream.

At step 1304, the method 1300 includes decomposing the light field image data into one or more perspective images based on a number of perspectives. The number of perspectives may be defined by the location of observers (e.g., as tracked by a location tracking device 810 illustrated in FIG. 8). Alternatively, the perspectives may be predefined locations (i.e., sets of quadruples) from which the light field is viewable. The control system 116 may use the perspectives to determine the modulation scheme. Therefore, a reduced number of perspectives may reduce the computation time required by the processor in the control system 116 to determine the modulation scheme.

At step 1306, the method 1300 includes rendering perspective images into the modulation scheme that forms a light field when used to modulate light from a light source. Based on the number of perspectives, certain portions of the light field may be neglected to be projected, as those portions of the light field may not be displayed (e.g., there may be no observer located at the location where the perspective corresponding to that portion of the light field is viewable, therefore it is not displayed). Because they may be neglected to be projected, the modulation scheme may include skipping over those perspectives (i.e., those perspectives are not rendered into the modulation scheme). Rendering perspective images into the modulation scheme that forms the light field may include calculating intensity values at each location (i.e., each light field quadruple) of the perspective image. Furthermore, calculating intensity values may include calculating intensity values for multiple wavelengths corresponding to multiple light fields when a color perspective light field image is to be displayed.

At step 1308, the method 1300 includes beginning rotation of the movable mirrored elements (e.g., the horizontally rotating movable mirrored element 118 and the vertically rotating movable mirrored element 120 illustrated in FIG. 1). This may involve engaging a motor or a set of electromagnets to begin the motion of the movable mirrored elements 118/120. In alternate embodiments in which alternate means of reflecting light from the light source 112 toward the screen 102 are used, step 1308 may by altered or neglected.

At step 1310, the method 1300 includes emitting light from the light source 112. Step 1310 may include the light source 112 being powered on and/or set to emission mode. Furthermore, step 1310, in some embodiments, may be performed by a control system within or connected to the light source 112. Additionally, step 1310 may include emitting light from multiple light sources. For example, if a light field projection unit being used to carry out method 1300 is analogous to the light field projection unit illustrated in FIG. 10, there may be multiple light sources 1022, 1032, 1042 for multiple wavelengths of light (i.e. colors in the visible spectrum). As an alternate example, if multiple light field projection units were used, each projecting separate perspectives that were being multiplexed, step 1310 could again include emitting light from multiple light sources (e.g., each corresponding to a separate light field projection unit).

At step 1312, the method 1300 includes modulating light from the light source using the modulation scheme. The modulation scheme may be stored within a memory of a modulator 114. Alternatively, the modulation scheme may be used by the control system 116 to repeatedly alter the conformation of the modulator 114 to modulate the light. Modulating the light may include electro-optic modulation methods of altering the intensity of the light received from the light source 112. Additionally or alternatively, modulating the light may include altering the wavelength and/or intensity of the light from the light source.

At step 1314, the method 1300 includes reflecting the modulated light toward a screen using the rotating movable mirrored elements 118/120 (or alternate elements, in various embodiments). In many embodiments, the modulation scheme created by the control system 116 has accounted for the timing of the rotation of the movable mirrored elements 118/120 such that the light is modulated in intensity for the specific, corresponding spot on the movable mirrored elements 118/120, and thus, ultimately, the corresponding location on the screen 102, to which that light will be directed. Also, in many embodiments, steps 1310, 1312, and 1314 may occur repeatedly and/or concurrently when carrying out the method 1300.

In some embodiments, one or more of the steps of method 1300 may be repeated multiple times for different scenes. For example, a sequence of light fields representing a moving scene (e.g., a live baseball game) may be projected by the projection unit. If the steps of method 1300 are repeated with sufficient rapidity (e.g., more than 24 times a second), motion in the moving scene may appear continuous to an observer due to the "persistence of vision" phenomenon. As an example calculation, if there are 1000 perspectives (e.g., 10 vertical locations of perspectives, each with 100 corresponding horizontal perspective locations), and the two-dimensional resolution of the scene at each of those perspectives is equivalent to 1080p technology (i.e., a resolution of 1920 quadruples by 1080 quadruples), with a refresh rate of 24 Hz, the projection unit 110 may need to output light rays at a rate of about 50 GHz (1000×1920×1080×24 Hz). If distributed among four projection units 1110, 1120, 1130, 1140 (as illustrated in FIG. 11), for example, this rate could be reduced by a factor of four for each respective projection unit 1110, 1120, 1130, 1140.

Additionally, the light fields generated by repeating one or more of the steps of method 1300 may be concurrently viewable from a plurality of perspectives. This may permit a binocular viewer to stereoscopically observe the progressing light fields, thereby being provided with a continuous-motion, 3D image of the moving scene.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:
1. A light field projection system, comprising:
a screen, wherein the screen comprises a plurality of convex reflective elements arranged in a two-dimensional array, each of the convex reflective elements being faceted; and
a projection unit, wherein the projection unit comprises:
a light source;
a modulator configured to modulate light from the light source; and
one or more movable mirrored elements, wherein each of the one or more movable mirrored elements is configured to reflect light from the light source toward the screen in such a manner as to sequentially scan the plurality of convex reflective elements; and a control system operable to determine a light modulation scheme for the modulator such that the light from the light source that is reflected by the one or more movable mirrored elements toward the screen to scan the plurality of convex reflective elements forms the light field that is concurrently viewable from a plurality of perspectives.

2. The light field projection system of claim 1, wherein the light source comprises one or more lasers.

3. The light field projection system of claim 2, wherein the light source comprises three lasers; one laser that outputs red light, one laser that outputs green light, and one laser that outputs blue light.

4. The light field projection system of claim 1, further comprising a tracking unit, wherein the tracking unit is configured to track the location of one or more viewers.

5. The light field projection system of claim 4, wherein the control system is operable to determine a light modulation scheme for the modulator such that the light field that is formed is viewable from the respective perspectives of each of the one or more viewers to generate a three-dimensional image.

6. The light field projection system of claim 1, wherein one or more of the one or more movable mirrored elements are rotating or vibrating multifaceted mirrors.

7. The light field projection system of claim 1, wherein the modulator comprises one or more filters to select one or more ranges of frequencies when modulating the light output from the light source.

8. The light field projection system of claim 1, further comprising one or more additional screens, each comprising a plurality of convex reflective elements arranged into a two-dimensional array, wherein the one or more additional screens are disposed adjacent to the screen.

9. The light field projection system of claim 1, wherein the modulator is an electro-optic modulator.

10. The light field projection system of claim 1, wherein a first movable mirrored element of the one or more movable mirrored elements controls a resulting horizontal location along the screen for the reflected light from the light source and a second movable mirrored element of the one or more movable mirrored elements controls a resulting vertical location along the screen for the reflected light from the light source.

11. The light field projection system of claim 1, wherein the one or more movable mirrored elements are further configured to reflect light from the light source toward the screen in such a manner as to sequentially scan the plurality of convex reflective elements in less than $\frac{1}{24}^{th}$ of a second, thereby enabling the light field projection system to achieve a light field reproduction rate of at least 24 distinct light fields per second.

12. The light field projection system of claim 1, wherein the light modulation scheme for the modulator is determined such that the light field that is formed is viewable from the plurality of perspectives to generate a three-dimensional image.

13. The light field projection system of claim 1, wherein the control system is a computing device comprising a graphics processing unit (GPU).

14. A method of generating a light field, comprising:
emitting light from a light source;
reflecting, from one or more movable mirrored elements, the light emitted from the light source toward a screen, the screen comprising a plurality of convex reflective elements arranged in a two-dimensional array, each of the convex reflective elements being faceted, in such a manner as to sequentially scan the plurality of convex reflective elements; and
modulating the light emitted from the light source using a modulator according to a light modulation scheme, wherein the light modulation scheme is determined by a control system such that the light from the light source that is reflected by the one or more movable mirrored elements toward the screen to sequentially scan the plurality of convex reflective elements forms the light field that is concurrently viewable from a plurality of perspectives.

15. The method of claim 14, further comprising:
tracking, by a tracking unit, the location of one or more viewers; and
determining, by the control system, the light modulation scheme for the modulator such that the light field that is formed is viewable from the respective perspectives of each of the one or more viewers to generate a three-dimensional image.

16. The method of claim 14, wherein modulating the light emitted from the light source further comprises one or more filters selectively transmitting one or more ranges of frequencies from the light emitted from the light source.

17. The method of claim 14, further comprising:
multiplexing in time, by the control system, the light emitted from the light source with light emitted from a second light source; and
modulating, by the modulator, the light emitted from the second light source according to the light modulation scheme, wherein the light modulation scheme is determined by the control system such that the light emitted from the second light source, when reflected by the one or more movable mirrored elements toward the screen to sequentially scan the plurality of convex reflective elements, forms the light field that is concurrently viewable from a plurality of perspectives.

* * * * *